United States Patent Office 3,577,523
Patented May 4, 1971

---

3,577,523
WATER-INSOLUBLE ANTIGENIC SUBSTANCES AND METHOD OF PREPARING THE SAME AND ANTIGENIC DEPOT AGENTS INCORPORATING SUCH SUBSTANCES
Morris Emmanuel Stolar, Trumbull, Conn., and Joseph George Feinberg, London, England, assignors to Miles Laboratories, Inc., Elkhart, Ind.
No Drawing. Filed Mar. 7, 1969, Ser. No. 805,378
Int. Cl. A61k *23/00;* C12k *5/00*
U.S. Cl. 424—88
8 Claims

ABSTRACT OF THE DISCLOSURE

Water-insoluble antigenic substances prepared by combining a liquid extract or suspension of an antigenic material with an insolubilizing agent such as a preformed aluminum tannate or in situ formed aluminum tannate, and antigenic depot agents incorporating these water-insoluble antigenic substances useful for stimulating prolonged antibody response.

BACKGROUND OF THE INVENTION

This invention relates to novel water-insoluble antigenic substances and to a novel process for the preparation thereof. The invention also relates to new antigenic depot agents incorporating such substances.

A reaction has long been known to occur in various individuals upon ingesting and, particularly, inhaling certain naturally occurring and synthetic particles or materials and through being stung by insects. This reaction is characterized by various allergic symptoms such as sneezing, activation of mucous glands, local edema, skin eruptions, shock, and vasodilation. The reaction-causing particles or materials comprise active principles or allergenically active materials and an inactive residue. These reactions in themselves may or may not be serious, however, they may lead to complications, physiologically and psychlolgically.

Hyposensitization of individuals subject to allergic symptoms has been observed as effective in preventing or substantially reducing the adverse effects to which these individuals are subject. In hyposensitization therapy, an individual is periodically given injections of increasing potency of an antigen or combination of antigens until a maintenance dose is reached. The antigen or combination of antigens administered is usually selected because of a suspected or demonstrated relationship to observed allergic symptoms, or reactions. This dose is maintained or adjusted depending upon the time of the year and the individual's allergic manifestations.

Many forms of allergenic extracts have been prepared and made available for use in hyposensitization treatment. Representative forms include, aqueous antigen extracts, antigen emulsions in oil (repository), antigen-gelatin combinations and the like.

Unfortunately, because of high water solubility of the antigen in some of the mentioned preparations, on injection the antigen is rapidly absorbed into the individual's system, resulting in occurrences of a systemic or constitutional allergic reaction. Because of the possibility of such a reaction, doses are limited in potency, and frequent injections are therefore necessary. Mineral oil emulsions have been utilized to retard release or absorption of the antigen; however, this has often been found to cause an undesirable absess to form at the site of the injection or to cause other adverse side reactions at or around the site of injection.

Additionally, it was often desirable to prepare prophylatic vaccines, such as from bacterial toxins or toxoids and viruses in such forms as to produce delayed adsorption when injected into a patient which offered the beneficial effect of prolonged antibody response. However, such a prophylactic vaccine was difficult to obtain with prior art techniques.

Many of the inadequacies of these previously known forms of antigenic extracts were overcome by the use of antigenic extracts produced by the process disclosed in U.S. Pat. No. 3,148,121. Briefly, this process comprises treating a whole undefatted allergenic material with an aqueous-heterocyclic tertiary amine extracting fluid, separating the liquid phase containing the active principles from the residue, discarding the residue, and removing the active principles from the heterocyclic tertiary amine, by adding water and an alum solution to the liquid extract to insolublilize the active principles. The insolubilized complex is then washed several times with water to remove all the heterocyclic tertiary amine and is finally resuspended in a physiologically acceptable vehicle such as, for example, a saline solution. Such an antigenic extract is referred to as PEAP, i.e., Pyridine Extracted-Alum Precipitated Antigen since pyridine is the preferable heterocyclic tertiary amine used in such a procedure.

Although the antigenic extracts produced by the process of U.S. Pat. No. 3,148,121 were a substantial improvement over prior art allergenic extracts, this process appears to produce relatively low yields, i.e., in the range of about 50% of the PNU's (protein nitrogen units) originally present in the aqueous-pyridine extract.

SUMMARY OF THE INVENTION

Therefore, it is an object of this invention to provide a process for the preparation of water-insoluble antigenic substances in which a substantial portion of the active principles contained in the extracting fluid are recovered as water-insoluble antigenic substances.

A further object of this invention is to provide antigenic depot agents incorporating water-insoluble antigenic substances that slowly release active principles and are readily absorbed without fear of adverse systemic reactions or other adverse side effects.

Other objects, and the manner of developing them will become apparent in the following descriptive portion.

DESCRIPTION OF PREFERRED EMBODIMENTS

This invention is embodied in a process for preparing water-insoluble antigenic substances from liquid extracts or suspensions of antigenic materials, bacterial toxins or toxoids, and viruses, comprising combining the liquid extract or suspension with a material selected from the group consisting of a preformed aluminum tannate and an in situ formed aluminum tannate to separate from said extract a water-insoluble antigenic substance, and recovering said water-insoluble antigenic substance. The invention also comprises the novel water-insoluble antigenic substances formed by this process and antigenic depot agents comprising a combination of said water-insoluble antigenic substances and physiologically acceptable vehicles.

In practicing this invention, the process by which the liquid extract of the antigenic material is prepared is not considered critical. Many methods are known for separating active principles or antigenically active materials from inactive residues. Representative extracting processes and fluids for extracting allergenically active substances may be found in "Fundamentals of Modern Allergy," Prigal, editor, McGraw-Hill Co., Inc., 1960. For example, aqueous extracting fluids include the so-called Coca's solution having a pH of about 8.2, a buffered saline solution having a pH of about 7.0, a buffered sodium formaldehyde sulfoxylate solution having a pH of about 7.4, and a more concentrated solution of sodium formaldehyde sulfoxylate and buffered saline. Other extracting fluids, such as the aqueous-pyridine solution described in U.S. Pat. No. 3,148,121, may also be used in preparing the liquid extract from which the water-insoluble antigenic substances of this invention are formed. Additionally, glycerin or a glycero-saline solution has been successfully utilized in extracting the desired antigenic material. Numerous extracting fluids have also been suggested in areas of extracting bacterial and viral cultures for use as immunogenic agents. For example, see United Kingdom patent specification No. 527,803 wherein a method is disclosed for extracting bacterial cultures comprising the use of a fluid such as quanidine to solubilize the active principles from the inactive bacterial residue. A partial list of representative extracting fluids is presented here, and it is understood that many other fluids and processes will suggest themselves to one skilled in the art as equally useful in the process of the present invention.

The novel water-insoluble antigenic substances of the invention may be formed using liquid extracts of a variety of antigenic materials. Such materials include allergenically active substances such as ordinary dust found in homes and collected in vacuum sweepers and dust found in manufacturing concerns such as saw dust; epitheliums, such as cat, dog, horse and rabbit dander; feathers, such as from geese and chickens; seeds, such as those of cottonseed and kapok; insects and emanation from insects, such as bees, hornets and mosquitoes; pollens from trees, grasses and weeds, such as ragweed, orchard grass, timothy grass, maple trees and poplar trees; molds, such as *Aspergillus niger* and Alternaria. Exemplary of other antigenic materials are bacteria, such as pneumococci, *Haemophilus pertussis* and other gram-negative haemophilic organisms, bacteria of the coli-typhoid-dysentary-salmonella group and gram cocci such as meningococcus as well as other toxins, toxoids and viruses.

The active principles or allergenically active materials are beneficially extracted from the reaction causing particles or materials in accordance with accepted procedures for forming antigenic extracts. In such procedures, the substances are contacted with the extracting fluid and allowed to stand after contact. The period of contact may vary from a few hours to a matter of days. When allergens are being extracted, the substances may be defatted with a solvent, such as ether, prior to contact or whole undefatted allergens may be utilized. To achieve more complete extraction, the antigenic materials are contacted with fresh extracting fluid after separation from the first extracting fluid. After extraction, the extracting fluid containing the heat-labile active principles may be sterile filtered through a filter pad or filter membrane. As noted hereinabove, the method of obtaining the final liquid extract of allergenically active material is not considered critical to the invention; however, it is expected that proper biochemical extracting practices will be utilized in deriving this starting physiologically-active material for the process of the invention.

Additionally, similar preparations can be made from solutions of bacterial toxins or toxoids, such as, those derived from the diphtheria or tetanus organisms. One may also produce such tannate vaccines from suspensions of viruses, for example, influenza virus with the object of producing a depot type influenza vaccine. It will, of course, be apparent that the basic procedures can thus be used for any type of antigen for which a depot type vaccine is to be prepared.

The aluminum tannate used to form the water-insoluble antigenic substances of this invention from the liquid extract may be preformed, preferably as a gel or suspension, prior to addition to the antigenic extract. This preformed aluminum tannate is prepared by combining a soluble source of aluminum and tannic acid. A gel is facilely prepared, for example, with an aqueous solution of sodium acetate, potassium aluminum sulfate (hydrated) solution; and a sodium acetate, tannic acid solution. Additionally the solution may contain up to 50% glycerol. The ratios of these solutions, although not critical, are preferably selected to obtain a one to three tannic acid to aluminum ion ratio. The gel is then separated from the liquid by centrifuging or other separating means, and is washed with a fluid such as a 0.9% saline solution. The washed gel of precipitated aluminum tannate is suspended in a 0.9% saline solution prior to the addition thereof to the antigenic extract solution to form the desired water-insoluble antigenic substances.

The aluminum tannate may also be readily formed by addition of appropriate reagents directly to the extract. To form aluminum tannate in the extract, a suitable soluble source of aluminum and a tannic acid solution are added separately and directly to the extract. Exemplary suitable sources of aluminum are sodium aluminate, potassium aluminum sulfate, aluminum sulphate, aluminum lactate and aluminum chloride. To the combined extract and soluble aluminum solution, tannic acid solution is added to obtain about a one to three tannic acid to aluminum ion concentration as previously described.

An adequate amount of aluminum tannate or aluminum tannate forming compounds is used to bring about maximum yield of water-insoluble antigenic substance and substantially complete removal of antigenic material from the extract. Preferably, an excess of aluminum tannate or aluminum tannate forming compounds is added to the liquid extract. Substantially complete removal of antigenic materials may be obtained with weight ratios between about 2:1 to 15:1 aluminum to protein nitrogen. Greater amounts may be used while still obtaining substantially complete removal, and lesser amounts may be used if desired, depending upon particular operating conditions.

Protein nitrogen in an extract is commonly expressed in protein nitrogen units (PNU) which are equal to 0.00001 mg. nitrogen/ml. based upon the protein nitrogen content of the extract. The protein nitrogen unit (PNU) is commonly used to express the potency of allergenic extracts and accordingly may be used to interpret the strength of the water-insoluble antigenic substances formed according to this invention.

After the water-insoluble antigenic substances have been collected and washed, they are advantageously suspended in a physiologically acceptable vehicle suitable for use as an injectable. Such a vehicle may comprise a sterile isotonic saline solution. Preferably, the vehicle selected should be free of adverse side effects, such as secondary allergenic reactions and should not be detrimental to the structural integrity of the water-insoluble antigenic substances of this invention.

A properly constituted medication, including at least one water-insoluble antigenic substance of the invention in a suitable vehicle, is advantageously administered by injection into a patient at a potency dependent upon the prophylactic or therapeutic treatment desired. When the antigenic substances are allergens intended for hyposensitization therapy, initial potencies are generally lower than the ultimately desired maintenance dose that will provide the desired protection. In a large patient a maintenance dose of between about 3000 PNU's and 5000 PNU's is preferred. Depending upon the size and age of the patient and observed reactions upon injections, potencies administered will be varied to obtain the desired effect. Such medications are usually administred subcutaneously.

The invention will be more particularly described in the following examples.

Example I

Five (5.0) grams of a mixture of high and low ragweed pollen, after being defatted with anhydrous ether and dried, were placed in a glass jar and covered with 70 ml.

of an aqueous buffered extracting solution comprising 0.8% sodium chloride, 0.5% phenol, and sodium phosphate and potassium phosphate buffers to establish a pH of 7.0. This mixture was allowed to stand at room temperature (about 23° C.) for 5 days after which the supernatant was decanted and the residue covered with 30 ml. of fresh buffered extracting solution. This fresh mixture was allowed to stand for 2 days at room temperature. The second supernatant extracting solution was decanted and the residue discarded. The supernatants were combined and then membrane filtered for sterilization. The resulting volume of 85 ml. was found to contain 50,000 PNU per ml.

A sodium aluminate solution (1%), 170 ml., was added to the sterilized extract and a tannic acid solution (10%) added until no further insolubilization of antigenic substance was observed. The water-insoluble antigenic substance was separated by decantation and washed 5 times with saline solution. The PNU value of the water-insoluble antigenic substance showed 100% recovery of the antigen based on the PNU in the sterilized combined extracts.

The water-insoluble antigenic substance was suspended in saline, the final volume of this suspension being made up to a volume equal to the initial volume of the buffered extract.

Example II

The procedure of this example was substantially the same as the procedure of Example I with the following exceptions: A collection of household dust was used instead of ragweed pollen. The household dust was placed directly in the extracting solution without being defatted. The resulting water-insoluble antigenic substance had a PNU value of 40,000 which represented 100% recovery of antigen. This water-insoluble antigenic substance was then processed as described in Example I.

Example III

The procedure of this example was substantially the same as that of Example I except that a mixture of grass pollens was used in place of ragweed pollen. The percent recovery and form of the water-insoluble antigenic substance corresponded to that of Example I.

Example IV

Five (5) g. of ragweed pollen were placed in a jar and just sufficient extracting solution added to cover the pollen. The extracting solution consisted of a 50% aqueous-pyridine solution to which a phosphate buffer was added to provide a pH of 7.0. This mixture was allowed to extract, with occasional stirring, for two days at room temperature. The bulk of the pollen residue was then removed by filtration, the extract filtered through regular filter paper, and then membrane filtered for sterilization. A volume of 100 ml. of the aqueous-pyridine extract was combined with 160 ml. of sodium aluminate solution (1%) and a tannic acid solution (10%) added until no further insolubilization of antigenic substance was observed. The water-insoluble antigenic substance was separated by filtration and washed 5 times with a saline solution. The PNU value of this water-insoluble anti-genic substance indicated 100% recovery of antigen based on the PNU value of the sterilized extract. The water-insoluble antigenic substance was suspended in saline, the final volume of the suspension being made up to a volume equal to the initial volume of the sterilized extract solution.

Example V

Timothy grass pollen (7.5 grams) were placed in a jar and covered with 100 ml. of a Tris-NaCl extracting solution [NaCl—5 g.; sodium azide—1 g.; tris (hydroxymethyl)aminomethane—5 millimoles; HCl—1.22 millimoles; water to 1,000 ml.]. This mixture was allowed to stand 5 days with occasional stirring at room temperature. The extracting solution was then separated from the pollen residue by filtration and dialyzed against aqueous glycerol in three stages to a final glycerol concentration of 50%. The final glycerol solution contained 423 μg. of protein nitrogen per ml.

Ten (10) ml. of the glycerol solution were mixed with 250 mg. aluminum tannate gel containing 11.4 mg. aluminum. The aluminum tannate gel was prepared by mixing the following: 50% glycerol-water—10 volumes; 2% sodium acetate, 5% potassium aluminum sulfate (hydrated)—4 volumes; and 2% sodium acetate, 5% tannic acid—2 volumes. The aluminum tannate gel was centrifuged and washed three times with 0.9% sodium chloride and the final product suspended in 0.9% sodium chloride. The mixture of extract and aluminum tannate gel was allowed to stand for one day at room temperature and centrifuged to separate the water-insoluble antigenic substance from the liquid phase. The water-insoluble antigenic substance was washed four times with saline solution and resuspended in saline. The water-insoluble antigenic substance was found to contain substantially 100% of the original protein nitrogen present in the glycerol extract solution.

Example VI

A 10 ml. quantity of the timothy grass pollen-glycerol solution prepared in Example V was mixed with 4 ml. of an aqueous 5% potassium aluminum sulfate solution containing 2% sodium acetate, and 2 ml. of an aqueous 5% tannic acid and 5% sodium acetate solution. The mixture was then allowed to stand for one day. A water-insoluble antigenic substance formed and was collected, washed as previously described and the protein nitrogen content determined. The water-insoluble antigenic substance contained substantially 100% of the original nitrogen available in the glycerol extract.

Example VII

Fifty-five normal albino female virgin guinea pigs of mixed strain each weighing 250 to 275 grams were used for evaluation of a ragweed pollen water-insoluble antigenic preparation formed according to Example I. The evaluation method was that reported by Gordon and Mansmann, J. Allergy 36; 239–248, 1965. A single low dose of 100 μg. of protein nitrogen of antigenic material was injected into the nape of the neck of each guinea pig. Twenty guinea pigs were injected with ragweed water-insoluble antigenic substance in saline, and twenty-five with PEAP ragweed extract. Each animal was used only once. Nine days after the injection half of the animals were skin tested and fifteen days after the injection the other half were skin tested. Each animal was skin tested intradermally with both 10 and 100 μg. protein nitrogen of an aqueous ragweed extract prepared substantially as described in the first part of Example I. Each site of skin test was observed and cross diameters of the wheal formed in millimeters measured at 4, 24 and 48 hours after skin testing. Biopsies were taken for physiological evaluation. Ten control, non-immunized, animals were tested in a similar manner.

Four hours after skin testing the animals who had received the water-insoluble antigenic substance were observed to have wheal reaction areas averaging 11.4 mm. in diameter and animals receiving PEAP were observed to have wheal reaction areas averaging 11.5 mm. in diameter with the 100 μg. application. For the 10 μg. skin tests, the animals given the water-insoluble antigenic substance were observed to have wheal reaction areas averaging 9.4 mm. in diameter and the animals receiving PEAP were observed to have wheal reaction areas averaging 8.8 mm. in diameter for the combined 9- and 15-day results. However, fifteen days after the injections were given, the animals receiving water-insoluble antigenic substance were observed to have wheal reaction areas averaging 11.7 mm. in diameter at the 10 μg. level while animals receiving PEAP had wheal reaction areas averaging 7.82 mm. in diameter.

What is claimed is:

1. A process for the preparation of a water-insoluble antigenic substance comprising combining an antigenic extract with a material selected from the group consisting of a preformed aluminum tannate and an in situ formed aluminum tannate to form a water-insoluble antigenic substance, and recovering the water-insoluble antigenic substance.

2. A water-insoluble antigenic substance prepared according to the process of claim 1.

3. An antigenic depot agent comprising a water-insoluble antigenic substance prepared according to the process of claim 1 and a physiologically acceptable vehicle therefor.

4. A process according to claim 1 in which the preformed aluminum tannate is prepared by combining a soluble source of aluminum with tannic acid.

5. A process according to claim 4 in which the soluble source of aluminum is sodium aluminate, potassium aluminum sulfate, aluminum sulphate, aluminum lactate or aluminum chloride.

6. A process according to claim 1 in which the in situ formed aluminum tannate is prepared by combining with the liquid extract separately a soluble source of aluminum and tannic acid.

7. A process according to claim 6 in which the soluble source of aluminum is sodium aluminate, potassium aluminum sulfate, aluminum sulphate, aluminum lactate or aluminum chloride.

8. A process according to claim 1 in which the liquid extract is prepared with an aqueous-pyridine solution.

References Cited
UNITED STATES PATENTS

| | | | |
|---|---|---|---|
| 2,321,043 | 6/1943 | Rockwell | 424—91 |
| 3,148,121 | 9/1964 | Strauss | 424—91 |
| 3,148,122 | 9/1964 | Strauss | 424—91 |

SHEP K. ROSE, Primary Examiner

U.S. Cl. X.R.

424—89, 91, 92